United States Patent [19]
Gillum

[11] 3,723,780
[45] Mar. 27, 1973

[54] SELF SHIELDING LINEAR MOTOR

[75] Inventor: Donald E. Gillum, Goleta, Calif.

[73] Assignee: Information Magnetics Corporation, Goleta, Calif.

[22] Filed: July 6, 1971

[21] Appl. No.: 159,934

Related U.S. Application Data

[63] Continuation-in-part of Ser. No. 883,179, Dec. 8, 1969, abandoned, and a continuation-in-part of Ser. No. 47,977, June 23, 1970.

[52] U.S. Cl. .................................. 310/13, 310/27
[51] Int. Cl. .............................................. H02k 41/02
[58] Field of Search ......... 310/13, 27, 12; 179/115.5, 179/116, 119, 117, 118, 145.1

[56] References Cited

UNITED STATES PATENTS

| | | | |
|---|---|---|---|
| 3,505,544 | 4/1970 | Helms | 310/13 |
| 3,577,023 | 5/1971 | Bleiman | 310/13 |
| 3,619,673 | 11/1971 | Helms | 310/13 |
| 3,656,015 | 4/1972 | Gillum | 310/13 |

*Primary Examiner*—D. F. Duggan
*Attorney*—Harry W. Brelsford

[57] ABSTRACT

The invention provides a linear motor having tubular magnets that are radially polarized. An external shell of magnetic material conducts magnet flux through a low reluctance path to a center core inside the tubular magnet. A tubular armature coil, preferably helically wound, is placed over the center core and occupies the air gap between the magnet and the low reluctance path. The motor can be closed at both ends or open at one end, or both ends, and in any case there is a very low stray magnetic field.

23 Claims, 9 Drawing Figures

Fig-I.

INVENTOR.
DONALD E. GILLUM
BY H.W. Brelsford
ATTORNEY

PATENTED MAR 27 1973 3,723,780

INVENTOR.
DONALD E. GILLUM
BY H. W. Brelsford
ATTORNEY

SELF SHIELDING LINEAR MOTOR

This application is a continuation-in-part of my copending applications Ser. No. 883,179 (now abandoned) filed Dec. 8, 1969, Ser. No. 47,977 filed June 23, 1970 and subject matter herein is disclosed in my copending application Ser. No. 140,032 filed May 4, 1971, now U.S. Pat. No. 3,656,015 issued Apr. 11, 1972.

My invention relates to electric motors of the linear motion type and has particular reference to a motor of the moving coil type designed to reduce to a minimum the stray magnetic fields in the air surrounding the motor.

While the motor may be used in various applications, it is particularly useful in the computer industry for moving magnetic heads that read or write data on rotating data storage disks having a magnetizable surface. Such read/write heads are extremely sensitive, responding to currents in the micro ampere category and receiving currents in the milliampere category. Any stray magnetic fields interfere with the operation of these heads. Electric motors of low enough magnetic leakage are useful for moving these heads to the precise track on the disks for either reading or writing.

The type of electro-magnetic actuator best suited for this use by reason of its excellent dynamic response, i.e., high efficiency and low mass, characteristics is the so-called "voice coil" type. These units to date are designed similarly in physical shape to that of the audio loud speaker drivers, and hence have retained the name of "voice coil" units. These units have a very high mechanical response to electric excitation and are fairly simple and reliable. They are relatively inexpensive to manufacture.

There is one serious problem associated with the use of the voice coil units which currently has restricted their scope of use. This problem centers around the rather large external stray magnetic flux which surrounds all units of this type which utilize the classic "voice coil" designs. This flux causes a severe magnetic bias to be imposed on the recording heads and magnetic recording media in close proximity. Various means of compensation and shielding have been resorted to in an attempt to nullify the effects of the stray fields. These means are expensive and are interfering with the interchangeability of the recording components from one machine to another and their performance. The compensation also impairs the general service reliability of the data processing system involved.

It is therefore a general object of the invention to provide an improved motor or electro-magnetic actuator that has external magnetic fields of such a low level that sensitive electronic and electro-magnetic devices can be fully used in close proximity.

Other objects, advantages and features of the invention will be apparent in the following description, including the drawings forming a part of this disclosure, in which.

Figure 1:
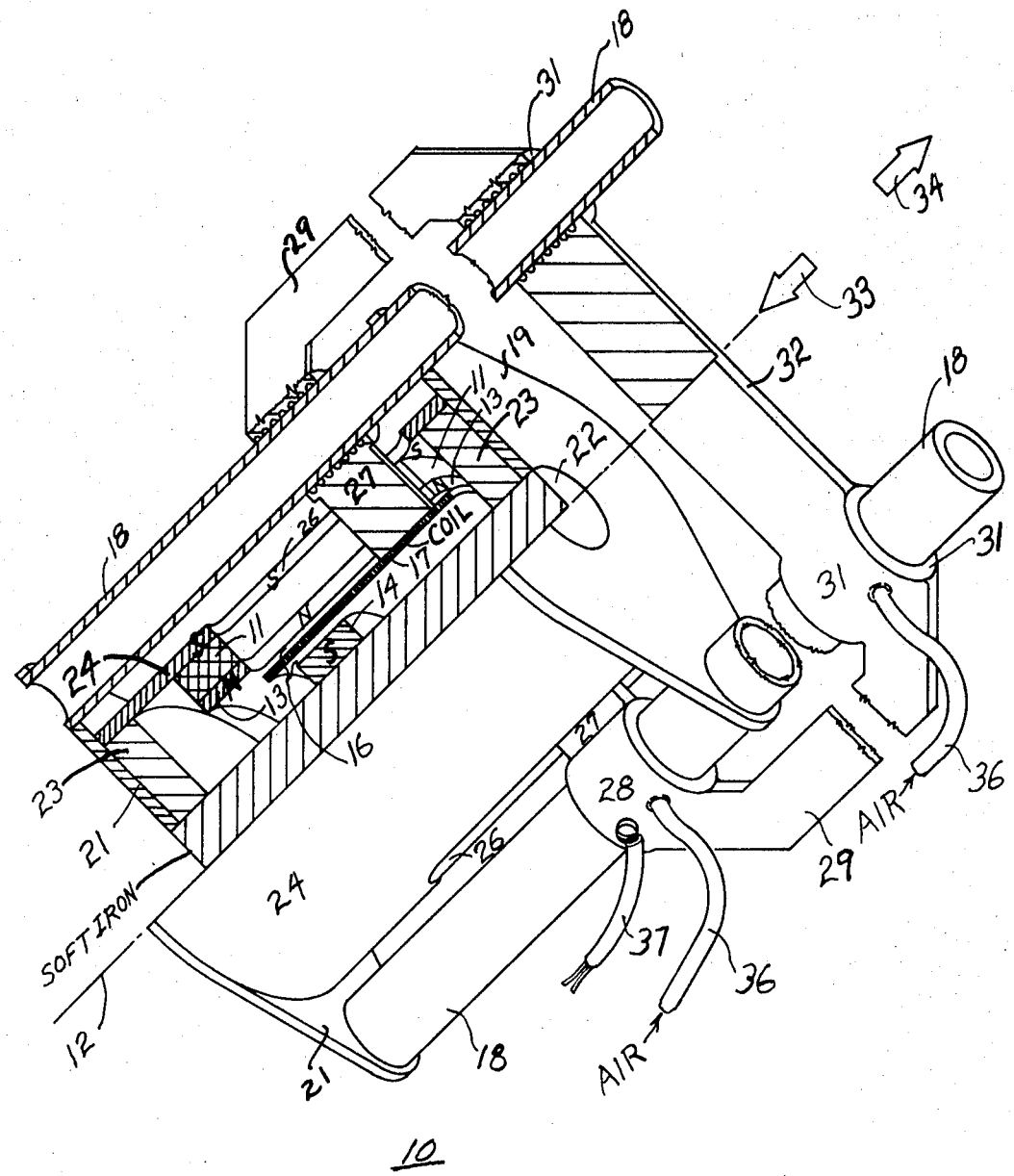
FIG. 1 is an isometric view, partly in section of a linear actuator motor incorporating the invention.

Referring to FIG. 1 there is illustrated a linear motor 10 embodying the invention. Disposed on the interior of the motor is a tubular magnet 11 which has an axis 12 and I presently prefer a cylindrical shape to this magnet. Disposed on the interior cylindrical surface of the magnet 11 is a soft iron sleeve 13 which concentrates the lines of flux emanating from the cylindrical surface. Space from the inner surface of the sleeve 13 is a ring 14 of soft iron or other low reluctance material and the spacing forms an air gap 16 which is the working air gap of the motor. Disposed in the air gap 16 is a coil 17 through which a current may pass to interact with the flux present between the ring 14 and the sleeve 13. It is this interaction of current in coil 17 and the magnetic flux that causes the coil to move and thereby give rise to the linear motion for which the motor is designed.

The motor may be supported in any suitable manner, and I prefer at present to employ a plurality of mechanical tubes 18 which act as a guide for the output motion of the motor. The tubes 18 pass through a pair of end plates 19 and 21, preferably of soft iron, and these end plates 19 and 21 support the motor. Passing through holes in the end plates 19 and 21 is a bar 22 of soft iron in intimate contact with the interior cylindrical surface of the soft iron ring 14. On the inside of each end plate 19 and 21 is a washer slug 23 forming part of the magnetic return circuit and the interior and exterior diameters of the slugs 23 are in intimate contact with the bar 22 and an exterior shell 24 which completely surrounds the magnet 11, the soft iron sleeve 13, and air gap 16.

I prefer at present to employ air bearings to guide the motion of the coil 17, although any suitable bearings could be employed. Cut into the top and bottom of the exterior shell 24, tubular magnet 11 and sleeve 13, are slots 26 through which passes a strut 27 mechanically connected to the coil 17 and the other end of which has an air bearing bushing 28 riding on the exterior of the support tubes 18. A pair of bridge members 29 may connect the strut bearings 28 to a corresponding pair of air bearings 31 connected by a single diametric strut 32 to which may be connected the mechanical parts to be moved by the motor 10. Arrows 33 and 34 indicate the motion of this strut 32. The air bearings are supplied by air under pressure delivered through tubes 36. The struts 27 may also carry the electric current to the coil 17 and there is illustrated a two wire conductor 37 leading to the lower air bushing 28 and this conductor is connected to the coil 17.

The materials of construction are important in the operating characteristics of the motor. Soft iron has a capability of transmitting several times the flux density of the strongest permanent magnets, and four or five times the flux density of ceramic magnets. This is the reason, therefore, for putting the bushing 13 of soft iron on the interior of the cylindrical magnet 11. This bushing or sleeve gathers up the lines of flux from the entire axial length of the magnet 11 to concentrate this flux in the region of the ring 14. The ring 14 is likewise preferably formed of soft iron or similar low magnetic reluctance material. The ring 14 is in intimate contact with the exterior surface of bar 22, which also may be formed of soft iron.

Figure 2:
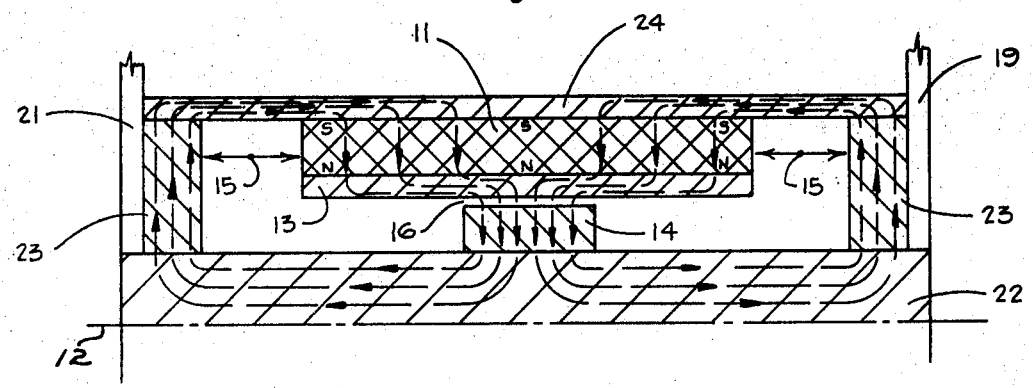
FIG. 2 is a schematic diagram of the magnetic circuit of a longitudinal section of the motor of FIG. 1.

Referring to FIG. 2 there is illustrated the magnetic circuit of the motor FIG. 1. There will be noted that the tubular magnet 11 has the iron bar 22 passing through it and has the sleeve 13 disposed on its interior surface. The air gap 16 is formed between the interior surface of the sleeve 13 and the ring 14. The lines of force are indicated schematically by several continuous lines passing through the magnet and the air gap. It will be noted that the sleeve 13 gathers up the lines of flux from the entire surface of the cylinder 11 and concentrates them at the air gap 16. The magnet 11, in trying to form lines of flux between its north pole and south pole, is provided with a path of least resistance or lowest reluctance through the soft iron structure 13, 14, 24, 23 and 22, forming a low reluctance circuit which the lines of flux follow instead of trying to circuit back within the magnet itself, or through the air gap at each end. In this connection the magnet 11 is spaced an appreciable distance from the end slugs 23 disposed on each end and this spacing is indicated by the arrows 15. The return circuit, therefore, for the lines of flux of the magnet 11 is through the sleeve 13, through the air gaps 16, through the pole piece ring 14, through the central bar 22, through the end slugs 23 and through the exterior shell 24, to the exterior of the cylindrical magnet 11. It will be appreciated by those skilled in the art that the air gap 16 is made as small as possible consistent with the mechanical passage of the coil 17 (FIG. 1).

While various materials of construction may be employed, or may be discovered in the future, I prefer to describe the iron sleeve 13 on the interior of the magnet 11 as a means for concentrating the lines of flux. Other suitable structures may be devised for this purpose, but the iron sleeve is inexpensive and efficient.

The conductor 17 (FIG. 1) can be made in any suitable fashion, and while there is illustrated in FIG. 1 a helical coil, this conductor could function by means of a split tube, foil sheets or almost any other type of construction. Various mechanisms can be employed to transmit the motion of the coil 17 to the exterior of the housing, for example, rods parallel to the axis 12. Such construction would result in lesser flux transmittal to the exterior air, but losses through the strut slots 26, FIG. 1, are within acceptable limits.

The relative power of soft iron to contain lines of force compared to metal magnets and ceramic magnets dictates that the ring 14 should have an axial length based on these proportions. Various factors will influence the choice of magnet materials, primarily the coercive force of the material, and these factors must be balanced against flux density. If stronger magnets are used the proportionate axial length of the ring 14 may be greater. The pole piece 14 is preferably located in the middle one half of the axial length of the magnet 11 for the most efficient utilization of the concentrating effect of sleeve 13.

It will be appreciated by those skilled in the art that the magnet 11 and pole piece 14 could be reversed in position. The magnet 11 could be a hollow cylinder through which passes the soft iron rod 22. The pole piece 14 could be an external ring spaced from the exterior surface of such a cylindrical magnet. Such a magnet is preferably also fitted with an external sleeve similar to the function of sleeve 13, for greatest motor efficiency. The outer shell 24 would then be in intimate contact with the outer surface of such a ring pole piece and would act (with end washer slugs 23) as a housing to completely surround the magnet and air gap, and thereby prevent any stray lines of flux from leaking outside the motor. Greater magnetic efficiency, however, is probably obtained from the configuration of FIG. 1 because of the greater magnet area.

Figure 3:
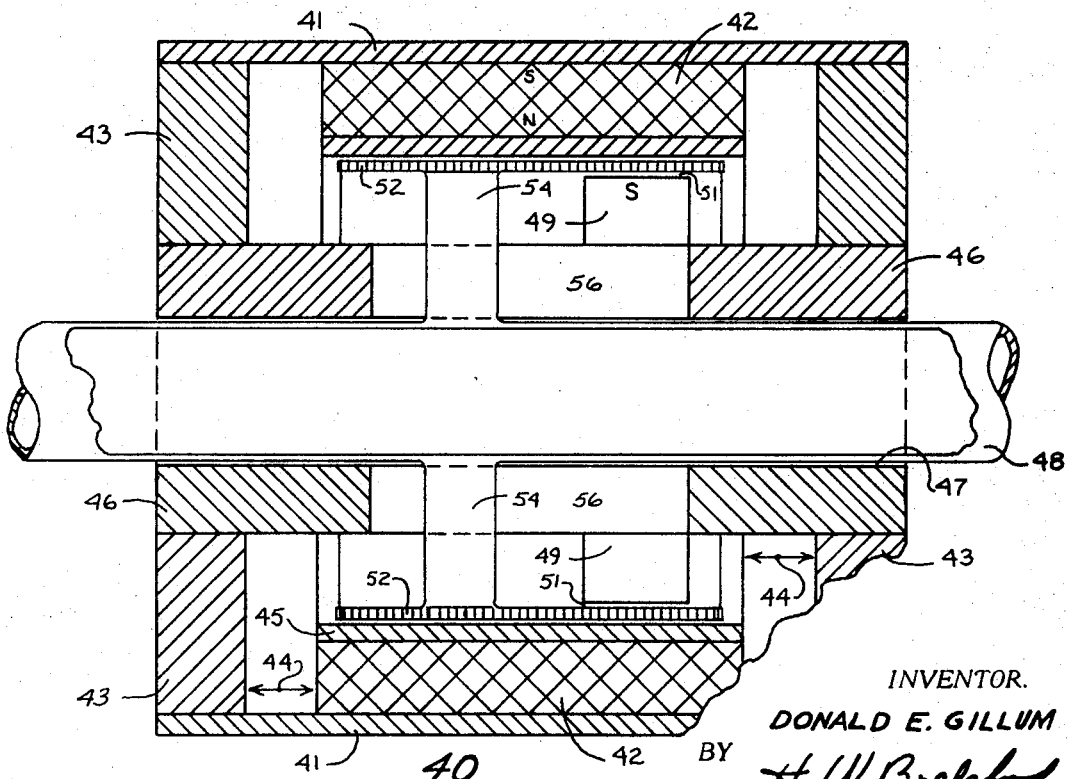
FIG. 3 is a view in full section of a modified form of motor embodying the invention wherein the power take-off is co-axially located.

Referring to FIG. 3 there is illustrated a modification of the invention wherein the movement of the coil is transmitted to an axial rod rather than to the external periphery of the motor as in FIG. 1. A motor 40 has an external cylindrical shell 41 in which is mounted a tubular magnet 42. Washer-like end pieces 43 are disposed at each end of the shell 41, but are spaced from the ends of the magnet 42 by an appreciable gap designated by the numeral 44. A tubular magnetic core, or return circuit member, is 46 mounted in the interior diameter of the end washers 43, and has a central bore 47 within which reciprocates a rod 48, which is preferably tubular to reduce mass. The central tubular magnet member 46 has a ring-like projection 49 which is spaced from an internal sleeve 45 in intimate contact with the interior surface of the tubular magnet 42. This spacing defines an air gap 51 which is the working air gap of the motor.

Disposed within the sleeve 45 is a conductor 52 shown as a helix which, of course, has a cylindrical or tubular shape, and a portion of this helix projects into the air gap 51. The portion of the helix 52 within the air gap at any one position is the active motor principle, which causes axial movement of the entire conductor helix 52. The conductor helix 52 is mechanically supported by one or more struts 54, mechanically connected to the reciprocable tube or rod 48. Suitable electrical conductors (not shown) may be passed through one or more of the struts 54 to supply electric current to the helical conductor 52. The tubular ferro magnetic core 46 is suitably slotted in a radial fashion to receive the struts 54 and allow them considerable axial movement as the coil 52 moves in response to current in it interacting with flux in the air gap 51. These slots do not appreciably weaken the magnetic return circuit.

The magnetic circuit for the motor of FIG. 3 is similar to that of FIG. 2, and for convenience an N and an S are placed on the magnet 42 of FIG. 3 to indicate a north and a south pole, respectively. In other words, the polarization of the magnet 42 is in a plane transverse to the cylindrical axis. The soft iron sleeve 45 gathers up the lines of flux from the inner surface of the magnet 42, concentrating them in the region of the pole piece 49 so that there is a high density flux in the air gap 51. The lines of flux continue through the annular pole piece 49, through the tubular magnet core 46, through the end pieces 43 and through the exterior cylindrical shell 41 to return to the opposite side of the magnet. Thus the magnetic circuit for the structure FIG. 3 is in all respects similar to that of FIG. 2.

The magnetic circuit just described forms a shell which encloses the magnet, the air gap and the pole piece so that no lines of flux can stray from the structure to interfere with nearby instruments. The interior of the bore 47 can be considered an exterior part of the shielding. Therefore, the rod 48 functions outside of the magnetic field of the motor and no appreciable flux escapes from the motor.

It will be apparent to those skilled in the art that the radially polarized magnets can be used without a low reluctance sleeve on the tubular surface adjacent to the air gap. Further, it will be apparent that the working air gap need not be concentrated at one particular axial portion of the tubular magnet. Such a use of "bare" magnets and distributed field is illustrated in FIGS. 4 and 5.

Figure 4:
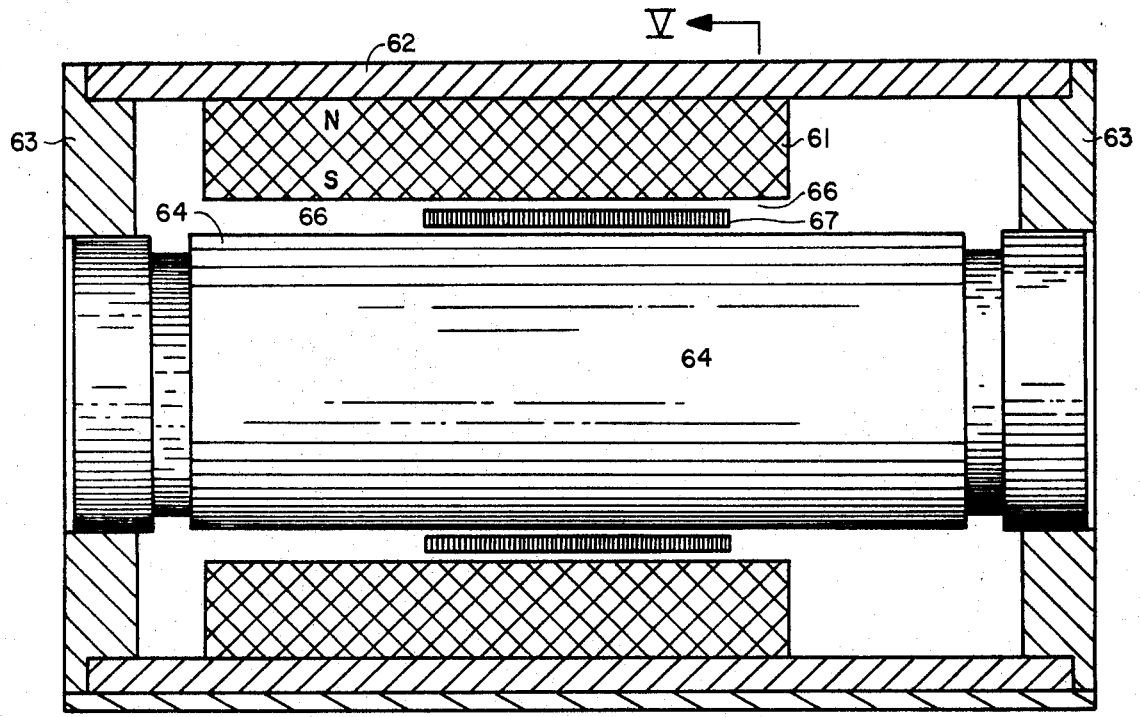
FIG. 4 is a view in vertical section of a closed end motor embodying the invention, wherein the working air gap extends for the full axial length of the magnet.

Referring to FIG. 4, a radially polarized tubular magnet 61 is disposed within a tubular shell 62 of low reluctance material, closed at each end by washer caps 63 that support a central core 64. Between the surface of the core 64 and the interior surface of the tubular magnet 61 is a working air gap 66 in which is disposed a moving armature coil 67 presently preferred to be of helical windings of wire.

Figure 5:
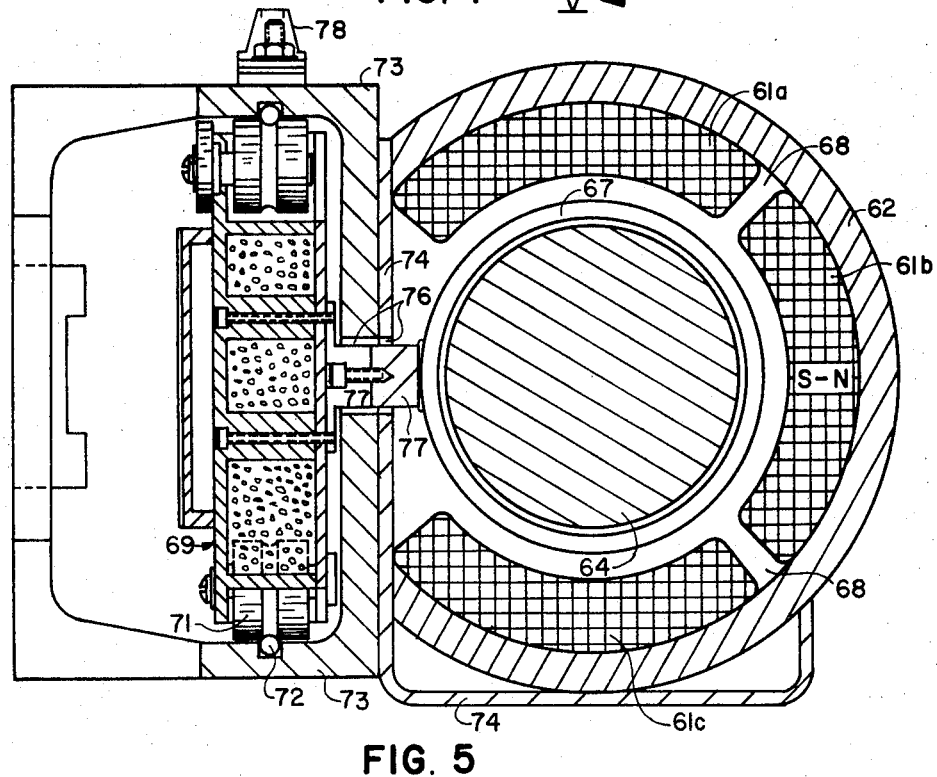
FIG. 5 is a sectional view along the lines V—V of FIG. 4, showing the armature core supported by a side mounted carriage.

Illustrated in FIG. 5 is a cross-sectional view of the motor of FIG. 4, wherein the tubular magnet 61 is formed of axial cylindrical segments 61a, 61b and 61c. These are separated by two air gaps 68 and one quadrant of tubular magnet section is missing so that the armature coil 67 may be supported laterally. The use of quadrant sections for the permanent magnet 61 facilitates manufacture and the use of air spaces 68 facilitates the manufacturing tolerances which preferably are broad under present manufacturing procedures to obtain the lowest magnet costs.

The armature coil 67 may be supported in any convenient fashion, and for illustrative purposes only there is shown a carriage 69, running on grooved wheels 71 riding on rails 72 supported in a channel frame 73 which, in turn, is secured to a J-shaped member 74. The J-shape 74 is preferably of low reluctance material and is welded or otherwise secured to the outer motor shell 62. Opposite the center of the armature coil 67 are slots 76 formed in the J-shape 74 and the adjoining channel member 73 through which projects a two-piece strut 77 securing the armature 67 to the carriage 69. Current may be supplied to the armature winding 67 in any convenient fashion; for example, by flexible strips having one end fixed at a terminal 78 and the other end secured to the carriage 69 and, hence, through the slots 76 to the armature 67.

While the absence of one quadrant of tubular magnet reduces the total flux cut by the armature coil 67, still the magnet is substantially tubular. Ceramic magnets are presently preferred, and the low reluctance material is preferably iron or low carbon steel. The armature may be formed of copper, aluminum silver wire, or other good electrical conductor. The magnetic circuit for the motor of FIGS. 4 and 5 is similar to FIG. 2, except that the flux is distributed fairly evenly over the entire axial length of the tubular magnet 61.

Figure 6:
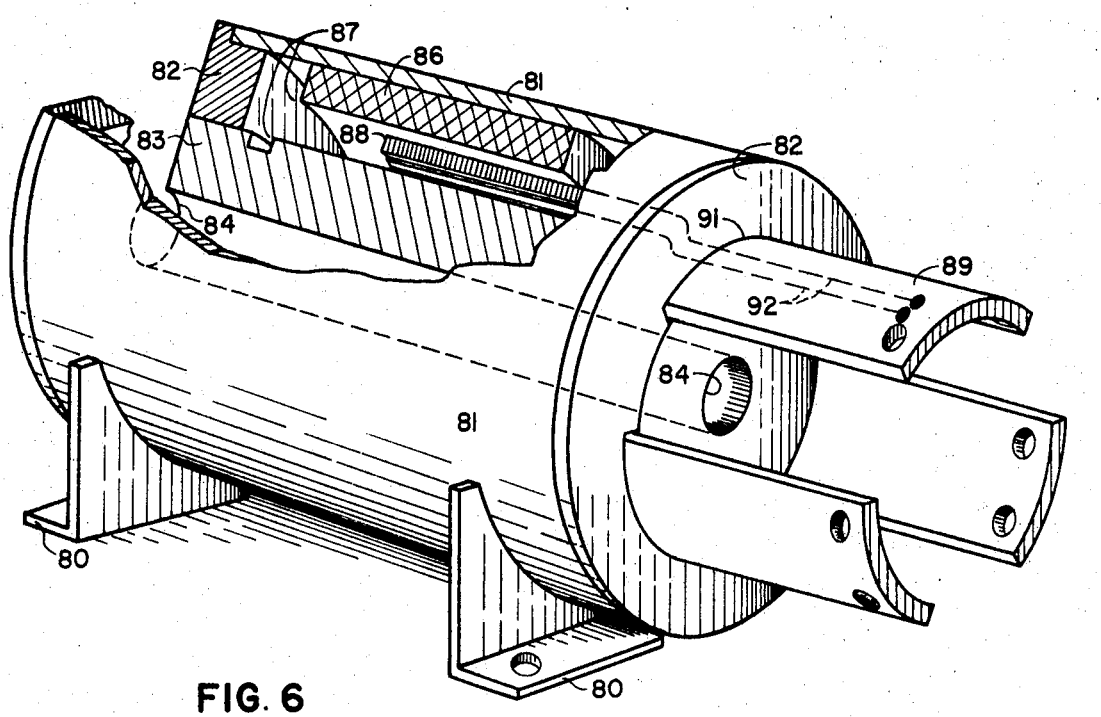
FIG. 6 is a three-dimensional view of a modified form of closed end motor wherein the armature is supported by struts that are tubular extensions from the armature coil, and these project through one end bell of the motor.

Illustrated in FIG. 6 is another structure for transmitting the motion of the armature to the exterior of the closed end of a motor. Supported on mounts 80 is a tubular shell 81 closed at both ends by end plates 82 of magnetic material that support a center core 83 which, if desired, can be longitudinally bored for placement of a linear tachometer, position transducer, or other motor related device. Secured to the outer shell 81 is a tubular magnet 86 that is radially polarized and which creates a working air gap 87 between its interior surface and the center core 83. Disposed in the working air gap 87 is an armature 88, presently preferred to be in the form of a helical winding of any cross-section, whether round, square, rectangular, etc. that fits the particular shape selected for the air gap 87. Secured to one end of the armature coil 88 by epoxy cement or other non-conducting fastener are tubular extensions 89 of the coil, and these preferably are of non-conducting material such as plastic. These extensions 89 pass through slots 91 in the right-hand end plate 82. The outer ends may be secured to a carriage such as that shown in FIG. 5, or may be secured to a slider such as that shown in FIG. 1, or may be secured to any other suitable guide that supports the armature through the support extensions 89. Electrical current may be supplied to the armature 88 in any convenient fashion, and illustrated are conductors 92 imbedded in one extension 89 leading to opposite ends of the coil 88. The slots 91 reduce the capacity of that plate 82 to conduct flux from the shell to the center core, and this right-hand end plate 82, accordingly, is made thicker than the left-hand plate 82 so that both plates 82 conduct equal amounts of flux. Alternatively, both end plates may be made thicker.

OPEN END MOTOR

I have discovered that my radially polarized tubular magnets emit such a low external field that my motors can be successfully used as open ended motors. Essentially, the motor of FIGS. 4 and 5 can be cut in two crosswise and each half used as an independent open ended motor. My motors can thus be used interchangeably with the prior art "voice coil" motors, which are open end motors. While there is some flux escape from the open end of my motors, it is so low as to be acceptable and is a great improvement over the fields emitted by voice coil motors. In comparing an open end motor of my design with a conventional open end motor, I found that my motor has a stray field strength of 3 gauss at 4 inches, and the conventional motor, 30 gauss at the same distance. Apparently this large stray field of the prior motors was due to having the magnet axis aligned with the motor axis, and this field was projected out through the air gap and from the open end of the motor.

In Alnico voice coil designs, the end of the central core at the open end of the motor is densely loaded i.e. to magnetic saturation i.e. is at high magnetic potential and hence exhibits a greater external flux than a member lightly loaded. The radially polarized design is the opposite wherein the end of the core at the open end at the motor is the best loaded member in the magnetic circuit and thus exhibits a minimal external field.

Figure 7:
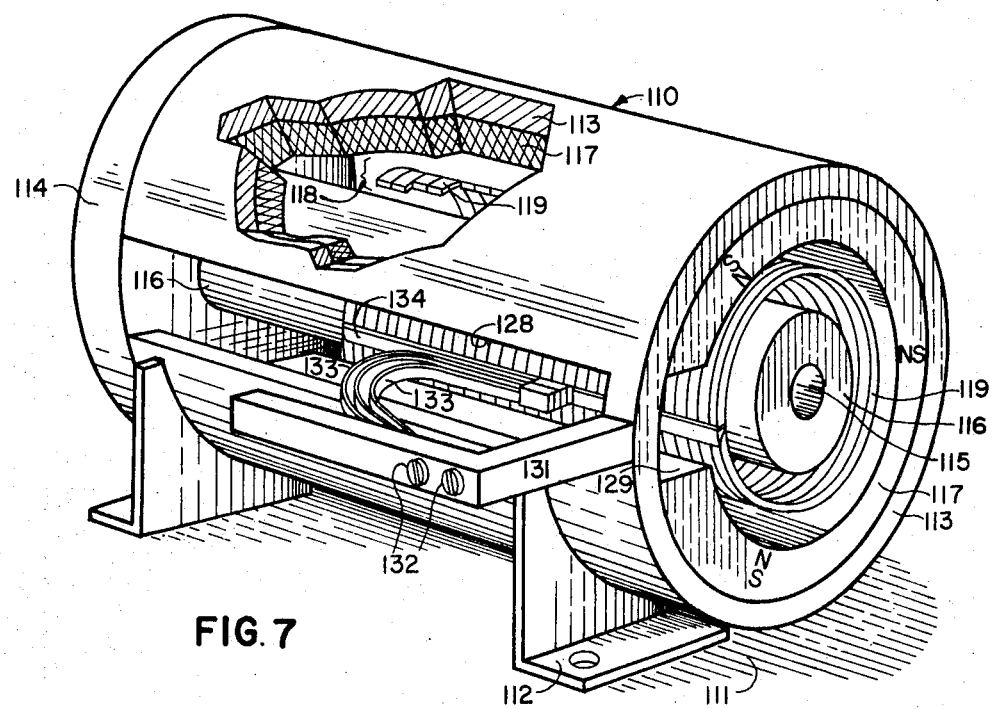
FIG. 7 is a three-dimensional view of a motor embodying the invention that is open at one end.

Referring to FIG. 7, there is illustrated an open end motor 110 resting on a surface 111. Brackets 112 support a cylindrical shell 113 which is open at its right end, but closed at its left end by a plate 114. Supported in cantilever fashion from the end plate 114 is a center core 116 which is spaced from and concentric with the outer shell 113. The shell 113, the end plate 114 and the center core 116 are all formed of magnetic material; that is, materials of high magnetic permeability and low magnetic reluctance, such as soft iron and low-carbon steel. The open end of the core 116 may have a center bore 115 for a velocity transducer or tachometer.

Disposed on the interior of the outer shell 113 is a tubular magnet 117 which is radially polarized uniformly over its entire cross-section and length. Accordingly, the notations on the right end of FIG. 7 of "N" and "S" illustrate that one pole is toward the interior surface of the tubular magnet 117 and the other pole is on the exterior surface. Lines of flux from this magnet travel into the outer shell 113, thence to the left to end plate 114 and into the center core 116 to become fairly uniformly distributed over the entire inner surface of the magnet 117. The inner surface of the magnet 117 is spaced from the center core 116 to define an air gap 118 which is the working air gap of the motor. A cylindrical coil 119 is disposed in this air gap 118 and cuts the lines of flux between the center core 116 and the interior surface of the magnet 117.

Figure 8:
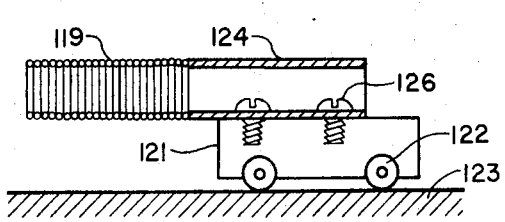
FIG. 8 is a sketch on a reduced scale of a carriage disposed at the open end of the motor of FIG. 6 for supporting the armature coil.

Illustrated in FIG. 8 is a presently preferred method of supporting the armature coil 119 and this includes a carriage 121 having wheels 122 which support it on accurately machined rails 123. Fastened to the top of the carriage 121 is tubular member 124 formed of a nonconductor material, such as plastic, and this may be secured in any suitable fashion to the carriage 121, such as by fasteners 126. The left end of the tube 124 of FIG. 8 may be adhered to the armature coil 119 in any suitable fashion, as by the use of epoxy cement. The carriage 121 accurately positions the armature coil 119 within its air gap, so that extremely close tolerances may be maintained in spacing between the adjacent surfaces defining the air gap 118. (FIG. 7).

Referring back to FIG. 7, current may be supplied to the armature coil 119 in any suitable fashion, and I presently prefer to introduce this from the side of the coil, although it could be supplied through the carriage 121. It will be noted that the exterior shell 113 of magnetic material is slotted lengthwise at 128 and the tubular magnet 117 has a similar slot 129 in registry with the shell slot 128. Extending from the shell 113 is an L-shaped member 131 which supports a pair of electrical terminals 132 to which are connected a pair of flexible strip conductors 133, the other end of which is connected to a lengthwise strip 134 on the armature coil 119. The strip 134 carries current from one conductor 133 to one end of the coil 119 and receives current from the other end of the coil 119. If desired, a center insulator strip 136 may be disposed between the two conductors 133.

Figure 9:
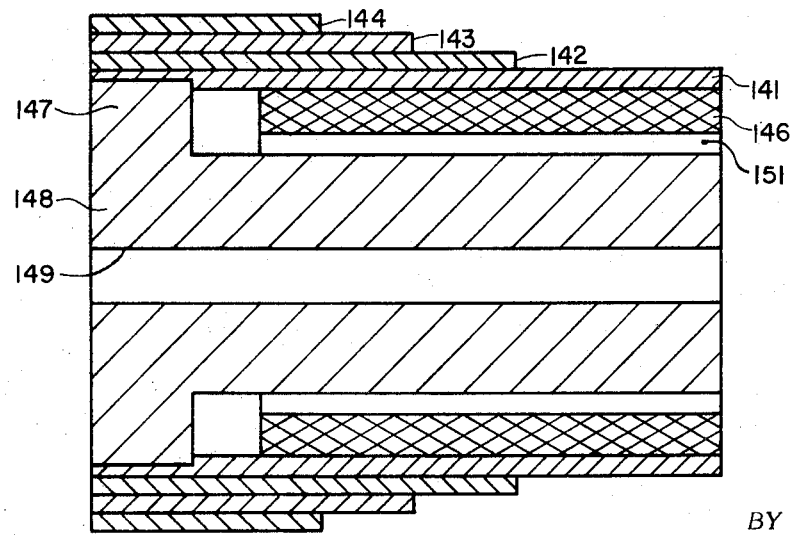
FIG. 9 is a view in full section of a presently preferred commercial embodiment of the open end motor of FIG. 6, wherein the external shell is tapered in thickness.

Referring to FIG. 9, there is illustrated a commercial modification of the motor of FIG. 7, wherein the minimum amount of metal is utilized. There it will be noted that an outer shell consists of telescoping tubes 141, 142, 143 and 144, each of varying length, giving a radial thickness that corresponds to the total flux present at different cross-sections. Secured to the inner surface of shell 141 is a tubular magnet 146 having a radial polarization. Supported in cantilever fashion from the inner shell 141 is a center core 148 which may be centrally bored at 149 to receive an ancillary mechanism, such as parts of a velocity transducer or, alternately, a position transducer. The center core 148 has an enlarged flanged end 147 which may be formed by upsetting the bar material.

The use of tubing for the exterior shell gives a low cost construction. The structure of FIG. 9 utilizes a minimum amount of metal in the external shell wherein the shell thickness is tapered in accordance with the quantity of flux at any axial position. The flux density in the shell is substantially uniform. The flux from the magnet follows a low reluctance path through the shells 141–144, then through the flange 147 into the center core 148, and from there across an air gap 151 to the magnet 146. The gap 151 is the working air gap and may be traversed by an armature (not shown) which may be of any desired construction and supported in any desired manner; for example, by the structures shown elsewhere in this specification. This motor housing structure will have the same low stray flux characteristic as that of FIG. 7.

The left end of the magnet 146 is spaced from the flanged end 147, which forms part of the low reluctance path, by a distance at least approximately the radial dimension of the magnet. This prevents magnetic "shorting" of the flux from one surface to the other.

It will be apparent to those skilled in the art that various modifications and variations can be made in the invention. For example, the working air gap can be on the exterior of the tubular magnets. Also, magnets of various materials can be used. The motor can be open at both ends as long as there is a low reluctance path connecting the center core and the outer shell. The low reluctance path can include an air gap or can include a magnet of reverse polarity, or both. Various types of magnetic material may be employed in the magnetic circuit. Various modes of supporting the armature coil and supplying it with current may be employed. Accordingly, the invention is not limited to the disclosed embodiments and there is included within the scope of the claims all variations and modifications that come within the true spirit and scope of the invention.

I claim:

1. A linear motor comprising:
   a. a tubular shell of magnetic material having a tubular axis;
   b. a center core of magnetic material magnetically connected to the shell by at least one low reluctance magnetic path;
   c. a tubular magnet disposed inside of the shell and having a radial polarization and defining an air gap between at least one of said shell and said center core;

d. a movable armature coil disposed in said air gap and having conductors generally in a plane transverse to the tubular axis of the shell;

e. means for supplying electric current to the armature coil;

f. and means connected to the armature coil and extending to the exterior of the motor for transmitting the motion of the armature coil.

2. A linear motor as set forth in claim 1, wherein end plates of magnetic material close off both ends of the shell and are in the magnetic path between the shell and the center core.

3. A linear motor as set forth in claim 1, wherein at least one end of said shell is open.

4. A linear motion motor of the moving coil type comprising:

a. a hollow cylindrical magnet having opposite poles on the interior and exterior surfaces of the cylinder and having a cylindrical axis;

b. means for concentrating the lines of flux on one of the surfaces of the cylinder;

c. a pole piece spaced from said cylinder surface having the concentrating means, to define a working air gap;

d. a magnetic return circuit connecting the pole piece to the other surface of the cylinder including a low reluctance shell enclosing the magnet and the air gap;

e. a conductor disposed in said air gap for axial movement and constructed to flow a current in a plane transverse to the cylinder axis;

f. and means extending through said magnetic return circuit to mechanically transmit the motion of said conductor as it moves axially within said magnet.

5. A motor as defined in claim 4 wherein the means for concentrating the lines of flux is located on the interior surface of the magnet and the pole piece is generally circular and spaced from the inside surface of said cylindrical magnet.

6. A motor as defined in claim 4 wherein the means for concentrating the flux is disposed on the exterior surface of the magnet and the pole piece is ring shaped and spaced from the exterior surface of the magnet.

7. A motor as defined in claim 4 wherein the pole piece is a ring and the magnetic return circuit includes an axial low reluctance member passing through that part of the magnet and pole piece combination located on the axis of the cylinder.

8. A motor as set forth in claim 7 wherein the low reluctance axial member is hollow and a rod reciprocates in the hollow and is connected to the coil for transmitting movement of the coil.

9. A motor as defined in claim 4 wherein the means for concentrating the lines of flux is a soft iron sleeve in intimate contact with one surface of the magnet.

10. A motor as defined in claim 4 wherein the conductor is in the form of a helix.

11. A motor as defined in claim 4 wherein the pole piece is located substantially within the middle one half of the axial extent of the magnet.

12. A linear motion motor of the moving coil type comprising:

a. a tubular magnet of uniform cross section along an axis and having a magnetic polarity transverse to the axis wherein the exterior surface is of one polarity and the interior surface of the magnet is of an opposite polarity;

b. a pole piece having a low magnetic reluctance and high saturation density, spaced from one magnet surface to form a working air gap;

c. a magnetic return circuit structure connecting the pole piece to the other surface of the magnet and including a shell of low reluctance material surrounding the pole piece, air gap and magnet;

d. a conductor disposed in said air gap and constructed to pass current in a plane transverse to said magnet axis;

e. and means extending to the exterior of said magnet return circuit structure and mechanically connected to the conductor to transmit movement of said conductor.

13. A motor as set forth in claim 12 wherein there is a central bore parallel to the magnet axis, a rod is mounted therein for reciprocation, and means mechanically connect the rod and conductor whereby movement of the conductor in response to conductor current interacting with the air gap flux is transmitted by the rod.

14. A motor as set forth in claim 12 wherein the pole piece is located inside the magnet, the magnet return circuit structure inside the magnet has a bore parallel to the magnet axis, a rod reciprocates within the bore, and means mechanically connect the conductor and the rod, whereby movement of the conductor in response to conductor current interacting with air gap flux is transmitted by the rod, and whereby the bore walls of the magnetic return circuit shield said bore from any stray flux and prevent flux leakage from the motor.

15. A linear motor as set forth in claim 1, wherein the exterior surface of the magnet is in contact with the tubular shell and an air gap is formed between the inner surface of the tubular magnet and center core.

16. A linear electric motor comprising:

a. a tubular shell of magnetic material having a tubular axis;

b. an end plate of magnetic material closing off one end of the tube, the other end being open;

c. a center core of magnetic material supported by said end plate in cantilever fashion and spaced from the shell;

d. a radially polarized tubular permanent magnet disposed within the cylindrical shell for magnetic contact with the surface of one of said shell or center core and spaced from the surface of other to form a working air gap;

e. an armature winding disposed in the air gap;

f. and means for supporting the armature for axial movement within the motor.

17. A linear motor as set forth in claim 1, wherein the thickness of the tubular shell varies over the axial extent of the magnet and the radial dimension of the shell is greater toward said low reluctance magnetic path connecting the shell to the core, whereby a minimum amount of material is used in the shell and the flux density in the shell is substantially uniform.

18. A motor as set forth in claim 1, wherein at least one end of the tubular magnet is spaced from the low reluctance magnetic path connecting the shell and center core by a dimension at least as great as the approximate radial dimension of the magnet.

19. A linear motor as set forth in claim 1, wherein the means for transmitting the motion of the armature coil includes a longitudinal bore in center core, at least one slot in the core extending from the bore to the exterior of the core, and a rod is disposed in the bore for reciprocation therein, and at least one support interconnects the rod and armature coil and is disposed in said slot.

20. A linear motor as set forth in claim 1, wherein the means for transmitting the motion of the armature coil includes at least one longitudinal slot in the tubular shell, and at least one support is disposed therein and is connected to the armature coil.

21. A motor as set forth in claim 1, wherein the one end of the tubular shell is closed by an end plate, the armature coil is generally tubular, and the means for transmitting the motion of the armature coil to the exterior of the motor includes tubular longitudinal support sections extending from one end of the coil and include slots in the end plate through which these extensions pass to the exterior of the plate.

22. A linear motor as set forth in claim 3, wherein the means for transmitting motion of the armature coil includes a support tube connected to one end of the armature coil and extending out of the open end of the shell, and an armature coil guide means is connected to the other end of the support tube.

23. A linear motor comprising:
a. a tubular shell of magnetic material having a tubular axis;
b. a center core of magnetic material spaced from the shell;
c. a tubular magnet disposed inside of the shell and having a radial polarization and defining an air gap between at least one of said shell and said center core;
d. a movable armature coil disposed in said air gap and having conductors generally in a plane transverse to the tubular axis of the shell;
e. means for supplying electric current to the armature coil.
f. and means connected to the armature coil and extending to the exterior of the motor for transmitting the motion of the armature coil.

* * * * *